(12) United States Patent
Bangalore

(10) Patent No.: US 9,396,252 B2
(45) Date of Patent: *Jul. 19, 2016

(54) SYSTEM AND METHOD FOR SPEECH-BASED INCREMENTAL SEARCH

(71) Applicant: AT&T Intellectual Property I, L.P., Atlanta, GA (US)

(72) Inventor: Srinivas Bangalore, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,200

(22) Filed: Nov. 26, 2014

(65) Prior Publication Data

US 2015/0081678 A1     Mar. 19, 2015

Related U.S. Application Data

(63) Continuation of application No. 12/638,570, filed on Dec. 15, 2009, now Pat. No. 8,903,793.

(51) Int. Cl.
*G06F 17/30* (2006.01)
*G10L 15/26* (2006.01)

(52) U.S. Cl.
CPC .... *G06F 17/30684* (2013.01); *G06F 17/30976* (2013.01); *G10L 15/26* (2013.01); *G10L 15/265* (2013.01)

(58) Field of Classification Search
CPC .... G06F 17/30; G06F 17/00; G06F 17/30253

USPC .................. 707/705, 706, E17.014; 715/816
See application file for complete search history.

(56) References Cited

U.S. PATENT DOCUMENTS

| | | |
|---|---|---|
| 5,799,279 A | 8/1998 | Gould et al. |
| 6,086,671 A | 7/2000 | Kawanishi et al. |
| 6,088,671 A | 7/2000 | Gould et al. |
| 6,862,713 B1 | 3/2005 | Kraft et al. |
| 7,113,950 B2 | 9/2006 | Brill et al. |
| 7,461,059 B2 | 12/2008 | Richardson et al. |
| 7,483,883 B2 * | 1/2009 | Barth et al. |
| 7,577,665 B2 | 8/2009 | Ramer et al. |
| 7,640,236 B1 * | 12/2009 | Pogue |
| 7,788,248 B2 | 8/2010 | Forstall et al. |
| 8,185,529 B2 | 5/2012 | Forstall et al. |
| 8,200,490 B2 | 6/2012 | Choi et al. |
| 8,239,130 B1 * | 8/2012 | Upstill et al. ................ 701/426 |
| 8,433,512 B1 * | 4/2013 | Lopatenko et al. .......... 701/426 |
| 8,566,029 B1 * | 10/2013 | Lopatenko et al. .......... 701/426 |
| 8,589,069 B1 * | 11/2013 | Lehman ....................... 701/438 |
| 8,620,579 B1 * | 12/2013 | Upstill et al. ................ 701/426 |
| 8,762,053 B1 * | 6/2014 | Lehman ....................... 701/438 |
| 2005/0262065 A1 * | 11/2005 | Barth et al. ....................... 707/3 |
| 2006/0069672 A1 | 3/2006 | Maloney et al. |
| 2006/0206454 A1 | 9/2006 | Forstall et al. |

(Continued)

*Primary Examiner* — Baoquoc N To

(57) ABSTRACT

Disclosed herein are systems, methods, and computer-readable storage media for receiving a user's spoken search query that the system will incrementally recognize and identify search terms. After the query has been incrementally recognized, the system will use the search terms to retrieve a portion of the search results that are based on usable identified search terms. As the results are found, the system will then output at least part at least part of the retrieved portion of search results on the display prior to the user concluding his or her search query.

20 Claims, 7 Drawing Sheets

(56) References Cited

U.S. PATENT DOCUMENTS

| | | |
|---|---|---|
| 2006/0230410 A1 | 10/2006 | Kurganov et al. |
| 2008/0131851 A1 | 6/2008 | Kanevsky et al. |
| 2008/0140643 A1* | 6/2008 | Ismalon .......................... 707/5 |
| 2008/0242343 A1 | 10/2008 | Koh et al. |
| 2009/0082037 A1* | 3/2009 | Ju et al. ..................... 455/456.3 |
| 2009/0287626 A1 | 11/2009 | Paek et al. |
| 2009/0287680 A1* | 11/2009 | Paek et al. ........................ 707/5 |
| 2010/0250521 A1* | 9/2010 | Mach ............................ 707/722 |
| 2010/0306249 A1 | 12/2010 | Hill et al. |
| 2010/0325100 A1 | 12/2010 | Forstall et al. |
| 2011/0106814 A1 | 5/2011 | Okato et al. |
| 2012/0215533 A1* | 8/2012 | Aravamudan et al. ........ 704/235 |

* cited by examiner

SYSTEM AND METHOD FOR SPEECH-BASED INCREMENTAL SEARCH

PRIORITY INFORMATION

The present application is a continuation of U.S. patent application Ser. No. 12/638,570, filed Dec. 15, 2009, the contents of which is incorporated herein by reference in its entirety.

BACKGROUND

1. Technical Field

The present disclosure relates to search queries and more specifically to retrieving partial results based on the search query prior to the search query being completed.

2. Introduction

Traditionally, in speech based interfaces a dialog model drives the interaction between the user and the device. This typically means that when a search query is completed and something in the query is ambiguous, a dialog manager would engage the user to clarify and disambiguate the search query. Further, similar techniques are used when the user's search query is too large to verbalize on a telephone channel or if it is imprecise. Then the dialog manager would narrow down the possible interpretations of the user's request.

Accordingly, what is needed in the art is an improved way to use voice based search queries.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
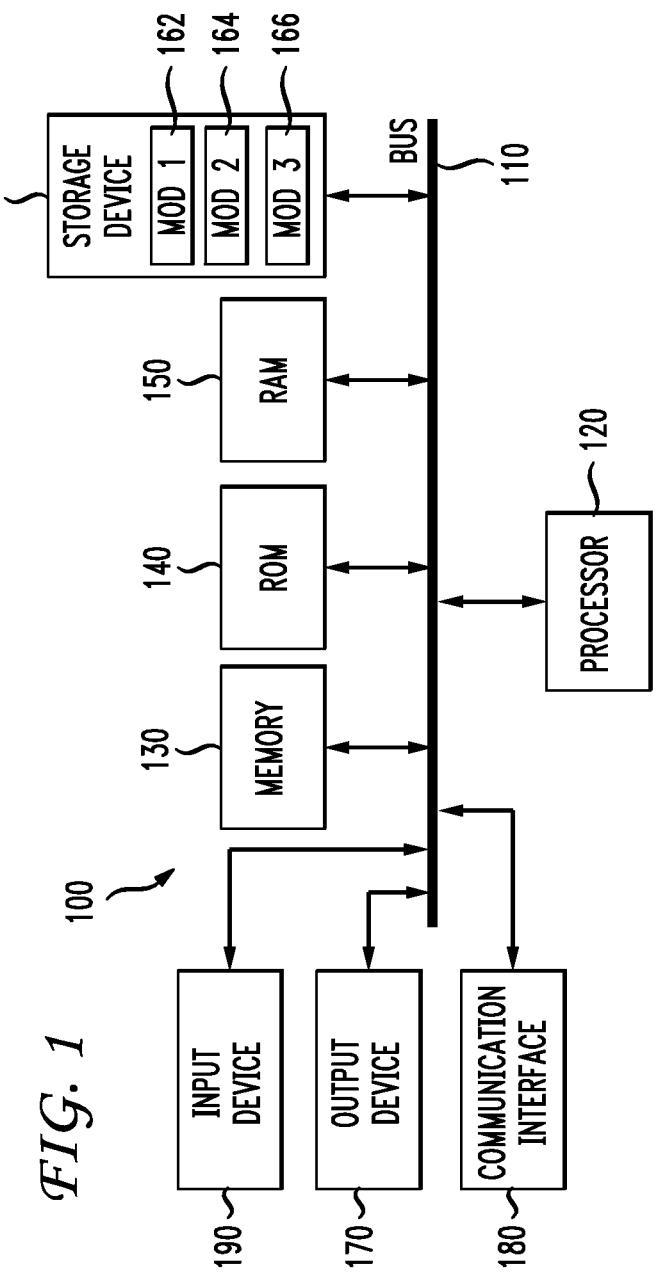
FIG. 1 illustrates an example of the components of the system embodiment.

With reference to FIG. 1, an exemplary embodiment is shown as 100 and includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is for instance a small, handheld computing device or a cellular telephone.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
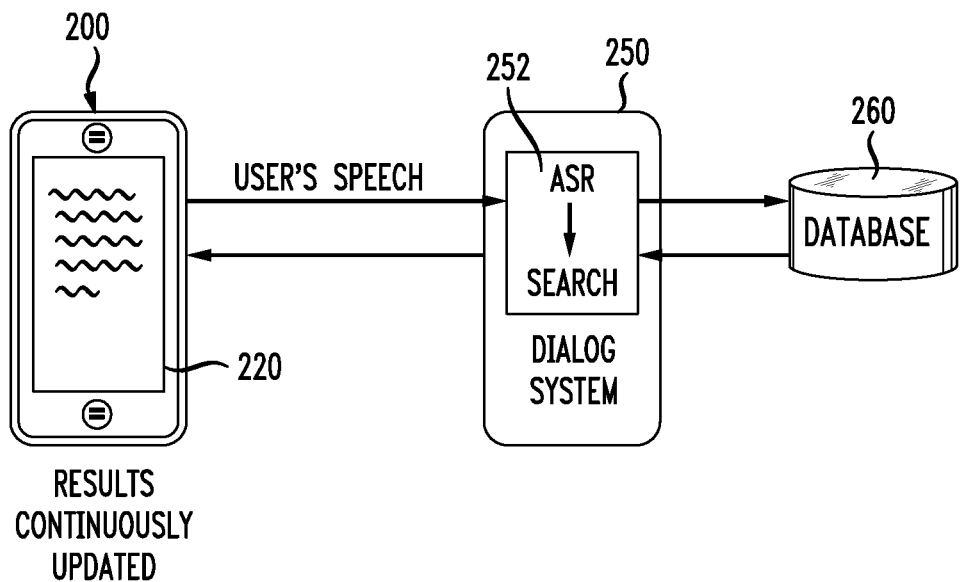
FIG. 2 illustrates an example of a system embodiment.

Having disclosed some basic system components, the disclosure now turns to the exemplary system embodiment shown in FIG. 2. For the sake of clarity, the systems and methods discussed herein can use the components such as those shown in FIG. 1 with a system configured to practice the method.

One embodiment of the system of the present disclosure is shown in FIG. 2. The overall system is going to have a multimodal device 200 that can accept a user's speech. The multimodal device will transmit the user's speech to a dialog system 250 where an automatic speech recognition unit 252 recognizes the speech and creates the search terms that are forwarded to the database 260. The database 260 returns matches based on the search query to the dialog system 250 which in turn communicates results from the search to the multimodal device. It is not necessary for the dialog system and the database to be separate from the multimodal device 200, as they are depicted in FIG. 2, but rather can either be integrated with the multimodal device, have three separate modules, or any practical combination of integration that follows this disclosure.

Figure 3:
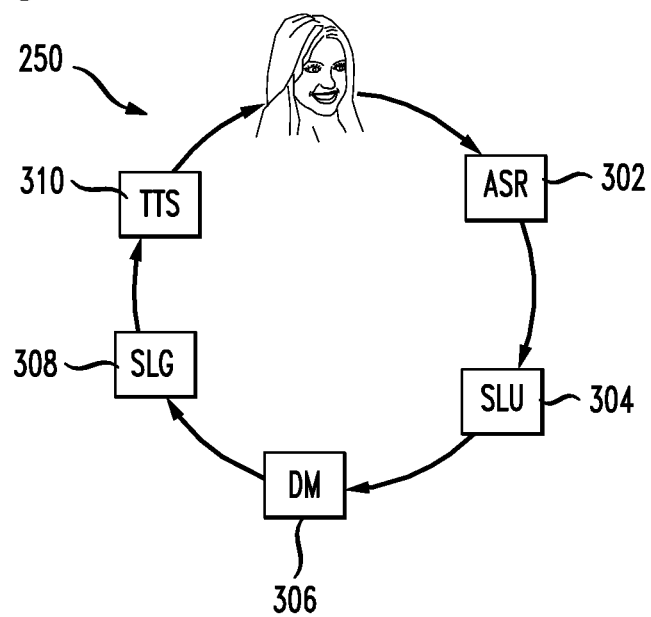
FIG. 3 illustrates an example of a spoken dialog system.

Multimodal device 200 can be any device that allows for multiple types of inputs and that can transmit voice and data, including a voice signal as data. This can commonly be seen in typical cellular telephones that can connect to data networks as well as portable computers that can carry voice and data as well. The dialog system 250 is any system or module that can translate a user's speech into a digital signal. An embodiment that can operate to satisfy the dialog system 250 is shown in FIG. 3, and represents a typical spoken dialog system. However, while all components shown in FIG. 3 are available for use with the system shown in FIG. 2, not all embodiments will require the use of all the described components. To further clarify this point, without limiting the set up of any embodiment, it is possible for the modules shown in FIG. 3, to be broken up into different locations, where for instance a multimodal device 200 can have a synthesizer to output generated speech. Therefore, the modules in FIG. 3 can be included or excluded in any embodiment and the modules can be in any location of the system shown in FIG. 2 if they are included.

Spoken dialog systems aim to identify intents of humans, expressed in natural language, and take actions accordingly, to satisfy their requests. FIG. 3 is a functional block diagram of an exemplary natural language spoken dialog system 250. Natural language spoken dialog system 250 may include an automatic speech recognition (ASR) module 302, a spoken language understanding (SLU) module 304, a dialog management (DM) module 306, a spoken language generation (SLG) module 308, and a synthesizer module 310. The synthesizer module may be any type of speech output module. For example, it may be a module wherein one of a plurality of prerecorded speech segments is selected and played to a user. Thus, the synthesizer module represents any type of speech output.

ASR module 302 may analyze speech input and may provide a transcription of the speech input as output. SLU module 304 may receive the transcribed input and may use a natural language understanding model to analyze the group of words that are included in the transcribed input to derive a meaning from the input. The role of DM module 306 is to interact in a natural way and help the user to achieve the task that the system is designed to support. DM module 306 may receive the meaning of the speech input from SLU module 304 and may determine an action, such as, for example, providing a response, based on the input. SLG module 308 may generate a transcription of one or more words in response to the action provided by DM 306. Synthesizer module 310 may receive the transcription as input and may provide generated audible speech as output based on the transcribed speech.

Thus, the modules of system 250 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 250, which the user then hears. In this manner, the user can carry on a natural language dialog with system 250. Those of ordinary skill in the art will understand the programming languages and means for generating and training ASR module 102 or any of the other modules in the spoken dialog system. Further, the modules of system 250 may operate independent of a full dialog system. For example, a computing device such as a smart phone (or any processing device having a phone capability) may have an ASR module wherein a user may say "call mom" and the smart phone may act on the instruction without a "spoken dialog."

The system of FIG. 2 is one embodiment of the present disclosure and it addresses the use of incremental query results in conjunction with a search interface. Specifically, the embodiment of the system presented in FIG. 4 of the present disclosure allows for the use of incremental query string and continually updated results provided to a user, the results being similar searches that were performed by other users. This allows the system to present on the interface, popular searches based on information provided by the user. This concept of using partial queries to orient a user to popular searches can also be applied to provide search results based on the partial queries as well. The system provides actual results as a user is inputting or speaking the query, and the search results are refined as each input is accepted. Furthermore, this allows a user to rephrase or refine the query as results are returned to reflect the results desired by the user.

Figure 4:
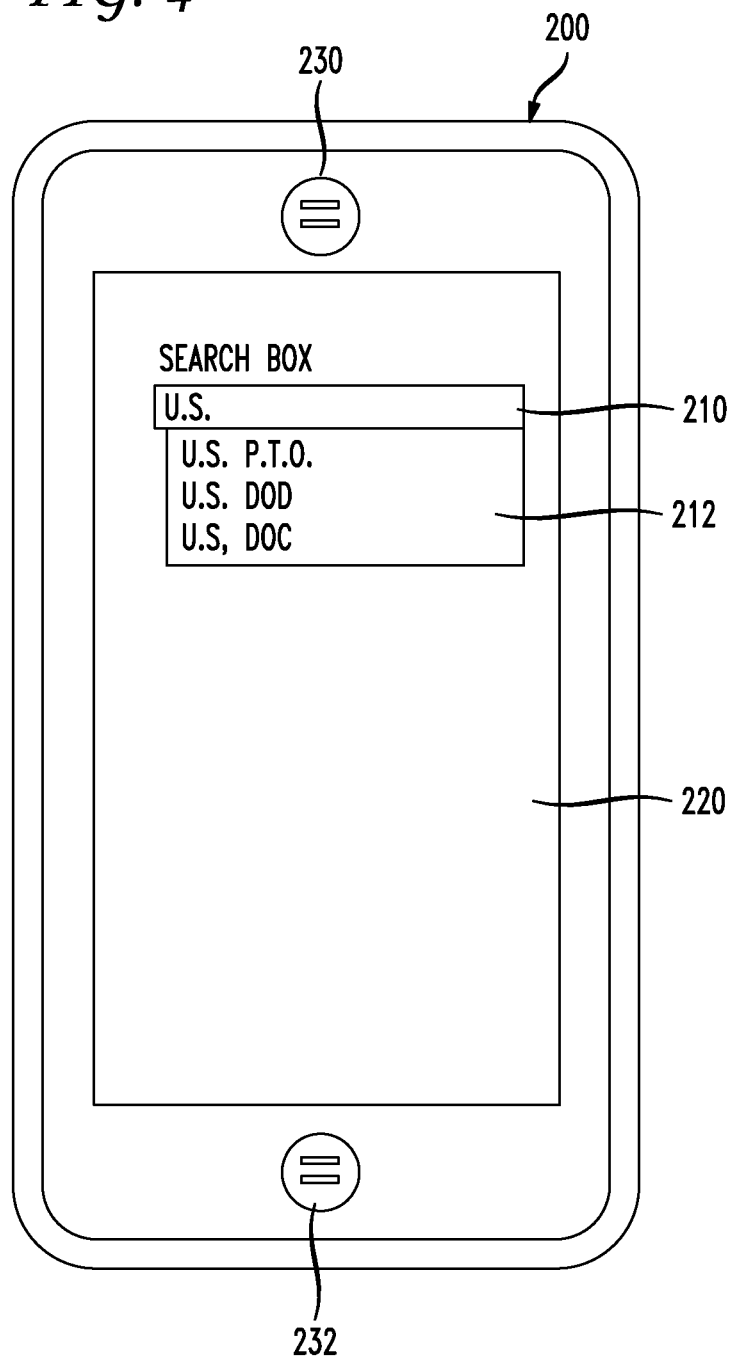
FIG. 4 illustrates an example multimodal device using one of the disclosed method embodiments.

Specifically, an embodiment of the present disclosure allows a user to provide search queries using voice commands that are accepted by a multimodal device. As shown in FIG. 4, device 200 is a multimodal device that allows a user to receive visual feed back based on the voice inputs into the search engine. The visual feedback is provided on screen 220. The feedback that is given to the user can include search results as well as the previously described search suggestions based on other user's queries.

Figure 5:
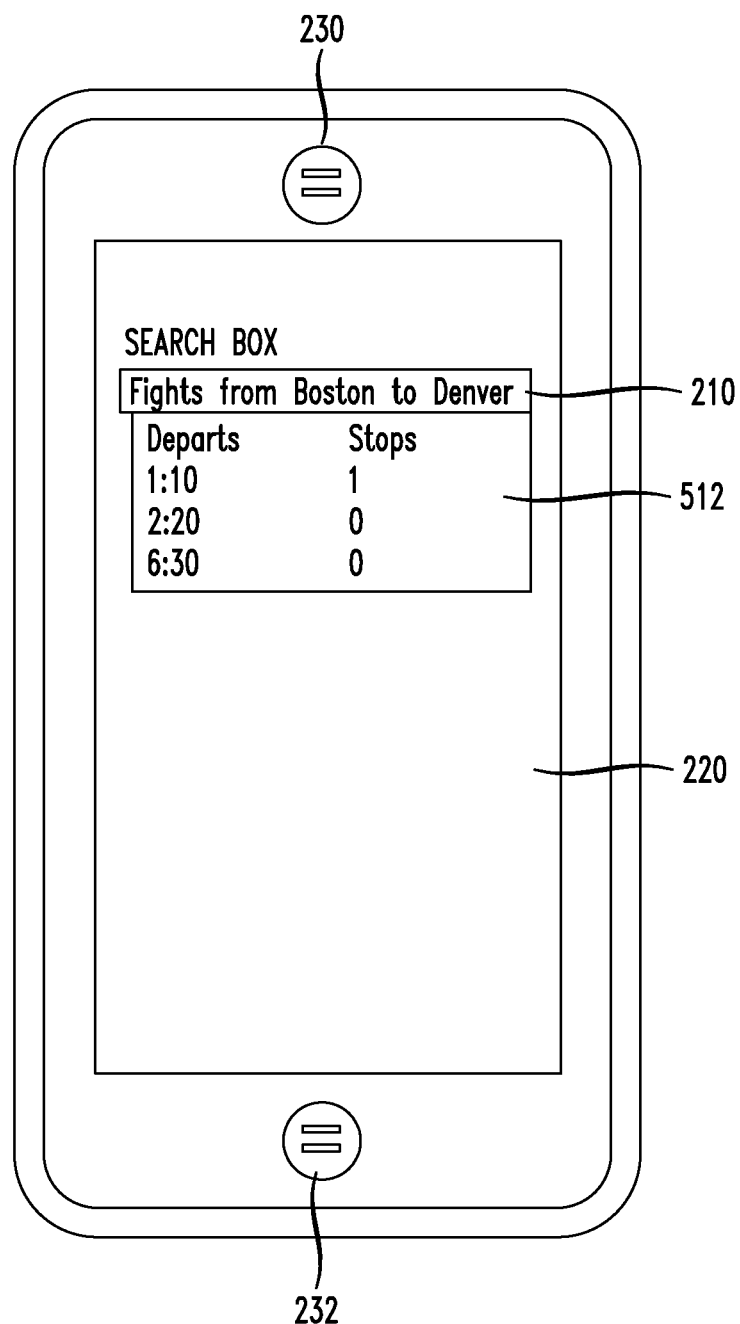
FIG. 5 illustrates an example multimodal device using one of the disclosed method embodiments.
Figure 6:
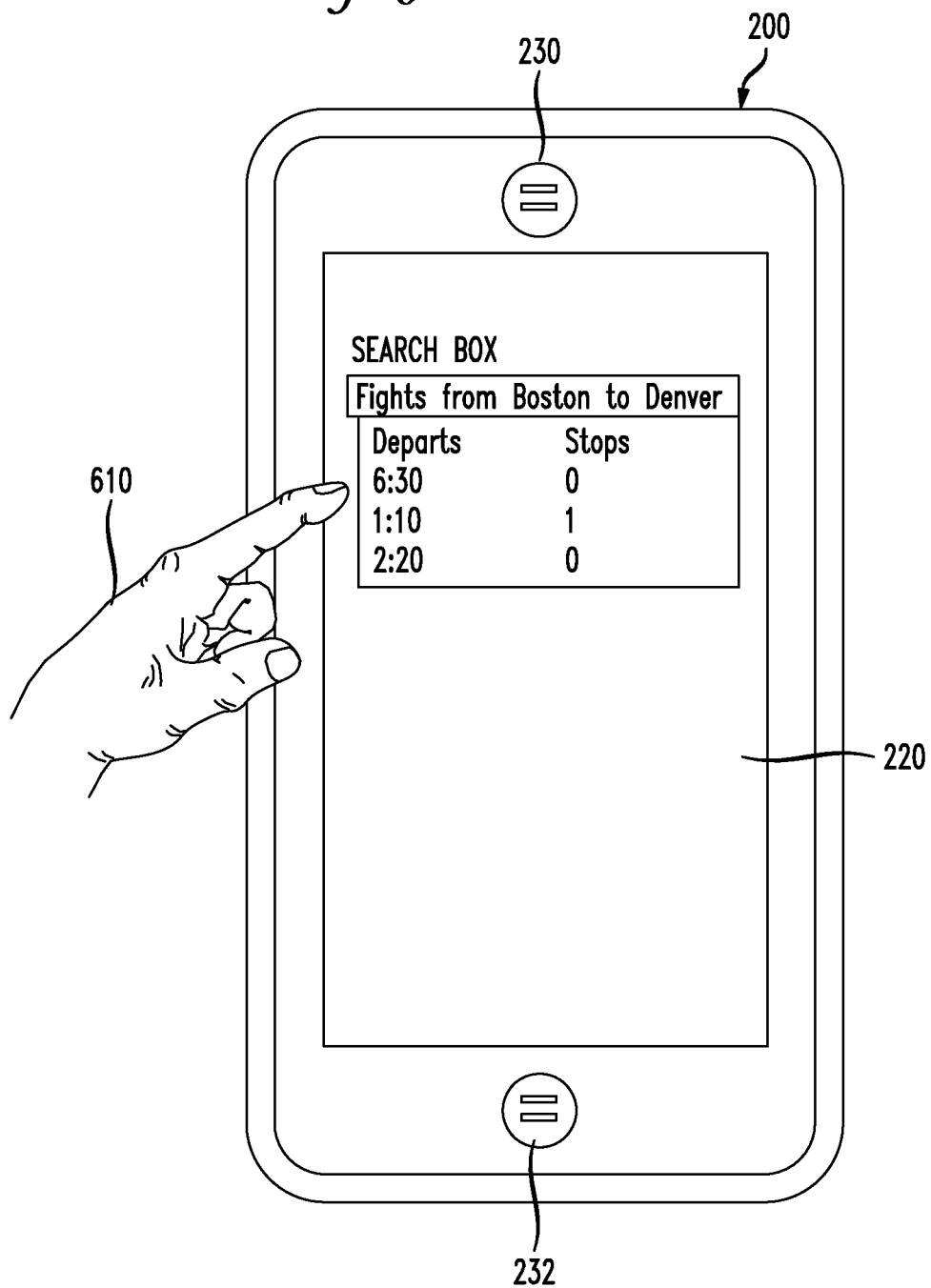
FIG. 6 illustrates an example multimodal device using one of the disclosed method embodiments.
Figure 7:
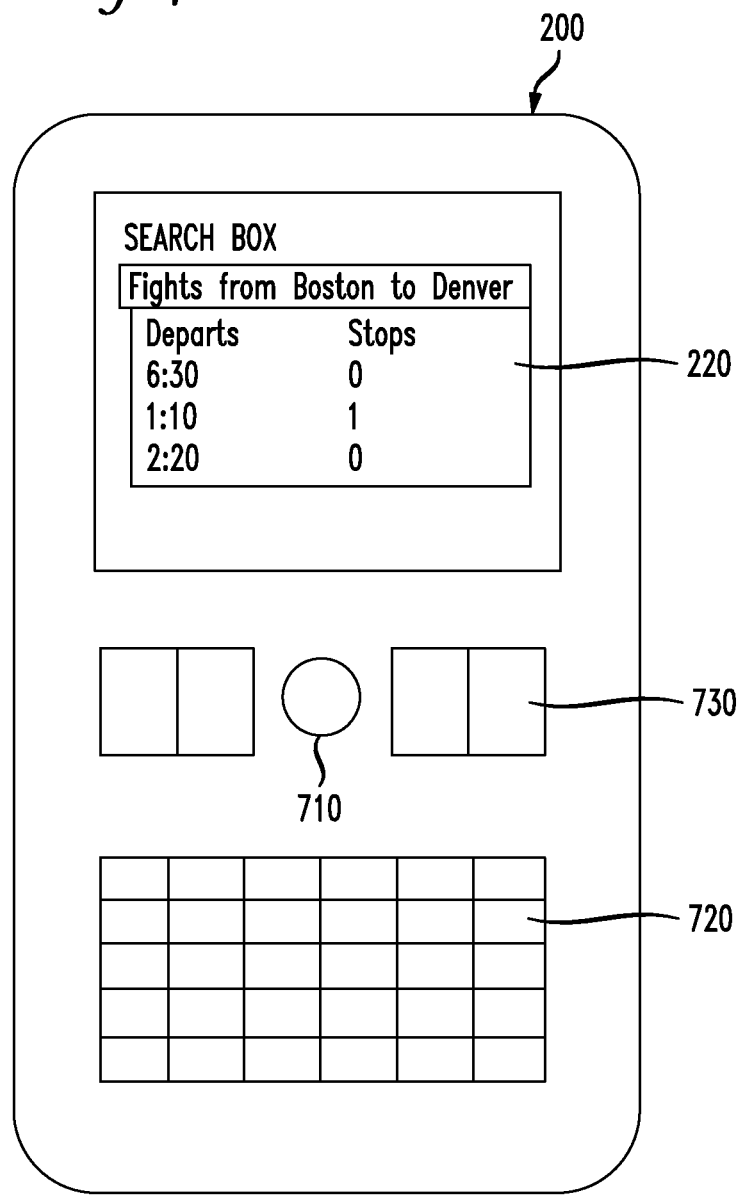
FIG. 7 illustrates an example multimodal device using one of the disclosed method embodiments.

FIG. 5 illustrates one embodiment of the present disclosure that allows for the retrieval of search results based on a user's search query. FIG. 5, represents a particular type of search, but is in no way limiting the disclosure to that search type. The search type shown is for flights from Boston to Denver. The multimodal device will receive the search query that is spoken by the user via the microphone 232. As the search query is accepted by the multimodal device, the search terms are identified and the search results are returned incrementally based on each term that is used. The results are then presented and updated on the display 220. Returning to FIG. 5, the user would initially issue a partial command, such as "Show me flights from Boston to Denver" and the system can search databases associated with flights and return results on the display 220. As the results are being displayed, the user can continue to narrow those results by continuing the query based on other factors. In FIG. 5, the results show flight times and the number of stops that are available on display 220 and in section 512. Therefore, the user can further narrow the results by saying "depart after 4 pm" or "only show non-stop flights" or the user can use both of these sequentially to further refine the results as they are being returned from the respective databases.

The above mentioned embodiment is facilitated by the integration of recognizing the user's search queries and the action taken by the system into a single step. This allows the system to identify the search query word by word and display the results as each word is recognized. The results may also be incrementally presented based on groups of words. The user can refine his or her searches as the words are spoken and have the results displayed. This integration can take place via numerous ways, however, by way of example, two embodiments will be described, but the present disclosure is in no way limited by these embodiments. One embodiment involves the tight integration of the recognition and search steps into a single model. For example, the finite-state model of the speech recognizer can be integrated with the finite-state model representation of the search module. Furthermore, another embodiment would have the search model react to each spoken word that is recognized and produce results based on the identified search terms. Regardless if one of these methods or a different method is used to integrate the two steps, e.g., recognizing terms and the system searching, this integration provides one method for incremental search as each word is being recognized by the search recognizer.

Another embodiment of the present disclosure allows the use of both voice and multimodal inputs to make and refine the search queries. In one aspect, the system accepts the voice search query "Show me flights from Denver to Boston" and then the system searches the databases associated with flights and starts to return results that meet the search query. Thereafter, instead of using a search query to refine the search, the user can input via touching the screen 220 using a stylus or a user's hand 610 to select a desired category. This would involve the user touching the "departs" heading or the "stops" heading and the system sorting the results based on the time of departure or the number of stops respectively. Another input could be via buttons 720 or a scroll wheel 710 on the multimodal device. This would allow the user to either move a cursor with the scroll wheel 710 or the buttons 720 and thereby select or refine the categories of the search. One further way that the buttons 720 can be used to refine input is that they can be used to add text to the search in addition to or in place of a user's voice. This can be accomplished through either a full QWERTY keypad or through a keypad that has alpha-numeric capabilities. Finally, the multimodal device is not limited to the inputs herein described and can have many more inputs that can be used to enhance the search results, including a GPS system to identify the location of the multimodal device or the multimodal device can contain an accelerometer.

The embodiments described herein can also perform functions that aid the user in completing a successful search. One example is an embodiment where the system can correct for missing or misidentified search terms, and provide the user with options of how to fix the missing or misidentified term. Misidentification can take place through a large number of processes, including ambiguity or recognition error. Ambiguity can stem from the search query itself, for instance, if a user is searching for movies that are available through a cable provider and uses the term "Godfather", the system may not be able to return an answer because many movies contain this word in the title. However, the system may make suggestions on the missing information by suggesting popular movies that include this title, like "The Godfather Part 1" or "The Godfather Part 2" and any other relevant title in order of popularity, thereby allowing the user to clarify the terms to be used in the search. Further, a search query that is either contradictory or does not make any sense in context can be identified and suggestions can be made to allow the user to fix this problem as well. For instance if a user misspeaks and says "Show me flights from Washington D.C. to Dulles" the system would be able to recognize that the departure and destination are from the same city and that therefore, no flights would satisfy this search. However, by using location of the user, via a GPS system, or via popular searches by the user, the system can identify where the user is or is likely to be, and suggest changes. So if the user is in San Francisco and makes the above query, the system may prompt the user with "Did you mean a flight from San Francisco to Dulles?" This would allow the system to make a suggestion that remedies a missing term in the search query that is deemed potentially important information that would allow the system to respond more appropriately to the query.

Figure 8:
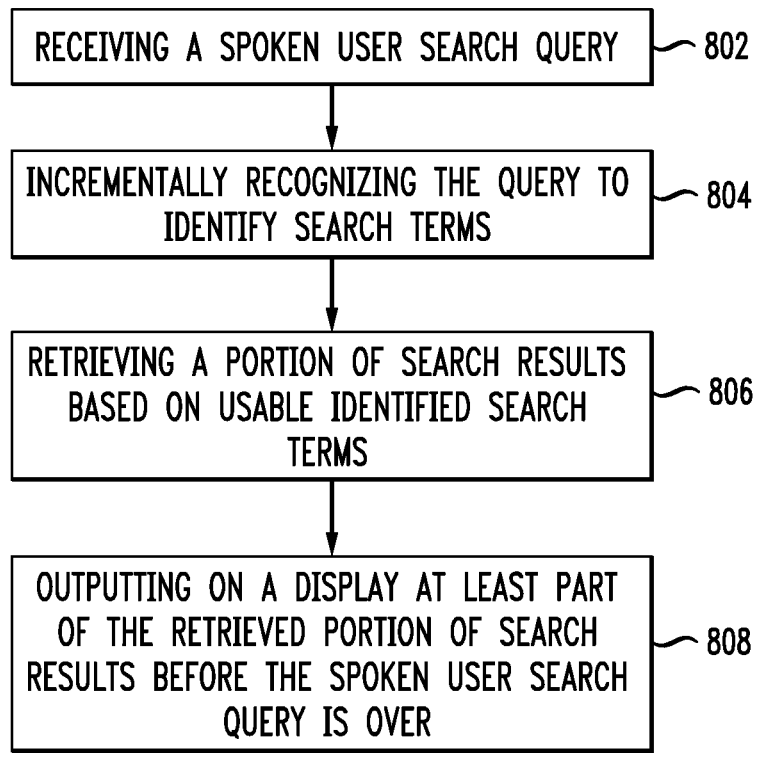
FIG. 8 illustrates a method embodiment of the present disclosure.

FIG. 8 illustrates an example method embodiment of the present disclosure. As shown, a method for incremental speech based searches includes initially receiving a spoken user search query (802). When the search query is received, the system incrementally recognizes the query to identify search terms that the system uses to facilitate a search that is requested by a user (804). Once the system begins searching it will retrieve a portion of the search results based on usable identified search terms that were input into the system (806). Furthermore, the system starts outputting on a display continuously updated results that are retrieved before the user completes his or her search query (808).

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be used to facilitate any form of search, for instance it could quickly lead a doctor to a patient's electronic medical files that are contained on a portable computing device. This could be especially advantageous for medical professionals since they frequently use verbal notes that could be transcribed by the system and stored in an easy to find patient file. Those skilled in the art will readily recognize various modifications and changes that may be made to the principles described herein without following the example embodiments and applications illustrated and described herein, and without departing from the spirit and scope of the disclosure.

I claim:

1. A method comprising:
   receiving a search query, wherein the search query comprises a first input modality and a second input modality, the first input modality being distinct from the second input modality;
   retrieving first modality search results for the search query using the first input modality of the search query;
   outputting, on a display and all at once, the first modality search results;
   retrieving, from a database, partial second modality search results based on the first modality search results and the second input modality as the second input modality is being entered;
   outputting, on the display, the partial second modality search results incrementally as the second input modality is still being entered;
   retrieving, from the database, final second modality search results based on the first modality search results and the second input modality upon the second input modality being completely entered; and
   outputting, on the display, the final second modality search results.

2. The method of claim 1, further comprising:
   receiving a correction to the search query; and
   updating the first modality search results and the final second modality search results based on the correction.

3. The method of claim 2, wherein the correction is speech input.

4. The method of claim 2, wherein the correction is multimodal input.

5. The method of claim 1, wherein the search query comprises two of speech, text, gesture, touch, and accelerometer-based input.

6. The method of claim 1, further comprising:
   receiving a rephrased multimodal search query after receiving the search query;
   incrementally recognizing the rephrased multimodal search query to identify rephrased search terms;
   retrieving additional search results based on the search query, the rephrased search terms, the first modality search results, and the final second modality search results; and
   outputting the additional search results on the display before the recognizing of the rephrased multimodal search query is complete.

7. The method of claim 1, further comprising:
   receiving a user selection of one of the first modality search results and the final second modality search results, to yield a selected search result; and
   outputting resources associated with the selected search result.

8. The method of claim 1, further comprising:
   identifying potentially important information absent in the search query based on one of user preferences and user history; and
   outputting suggestions associated with the potentially important information on the display.

9. The method of claim 1, wherein a same device receives the search query and outputs the first modality search results, the partial second modality search results, and the final second modality search results.

10. The method of claim 1, wherein the search query is a natural language query.

11. The method of claim 1, wherein retrieving the first modality search results, the partial second modality search results, and the final second modality search results is further based on one of a user demographic, a user profile, and a search history.

12. A system comprising:
a processor; and
a computer-readable storage medium having instructions stored which, when executed by the processor, cause the processor to perform operations comprising:
receiving a search query, wherein the search query comprises a first input modality and a second input modality, the first input modality being distinct from the second input modality;
retrieving first modality search results for the search query using the first input modality of the search query;
outputting, on a display and all at once, the first modality search results;
retrieving, from a database, partial second modality search results based on the first modality search results and the second input modality as the second input modality is being entered;
outputting, on the display, the partial second modality search results incrementally as the second input modality is still being entered;
retrieving, from the database, final second modality search results based on the first modality search results and the second input modality upon the second input modality being completely entered; and
outputting, on the display, the final second modality search results.

13. The system of claim 12, the computer-readable storage medium having additional instructions stored which, when executed by the processor, cause the processor to perform operations comprising:
receiving a correction to the search query; and
updating the first modality search results and the final second modality search results based on the correction.

14. The system of claim 13, wherein the correction is speech input.

15. The system of claim 13, wherein the correction is multimodal input.

16. The system of claim 12, wherein the search query comprises two of speech, text, gesture, touch, and accelerometer-based input.

17. The system of claim 12, the computer-readable storage medium having additional instructions stored which, when executed by the processor, cause the processor to perform operations comprising:
receiving a rephrased multimodal search query after receiving the search query;
incrementally recognizing the rephrased multimodal search query to identify rephrased search terms;
retrieving additional search results based on the search query, the rephrased search terms, the first modality search results, the second partial modality search results, and the second final modality search results; and
outputting the additional search results on the display before the recognizing of the rephrased multimodal search query is complete.

18. The system of claim 12, the computer-readable storage medium having additional instructions stored which, when executed by the processor cause the processor to perform operations comprising:
receiving a user selection of one of the first modality search results and the final second modality search results, to yield a selected search result; and
outputting resources associated with the selected search result.

19. The system of claim 12, the computer-readable storage medium having additional instructions stored which, when executed by the processor, cause the processor to perform operations comprising:
identifying potentially important information absent in the search query based on one of user preferences and user history; and
outputting suggestions associated with the potentially important information on the display.

20. A computer-readable storage device having instructions stored which, when executed by a computing device, cause the computing device to perform operations comprising:
receiving a search query, wherein the search query comprises a first input modality and a second input modality, the first input modality being distinct from the second input modality;
retrieving first modality search results for the search query using the first input modality of the search query;
outputting, on a display and all at once, the first modality search results;
retrieving, from a database, partial second modality search results based on the first modality search results and the second input modality as the second input modality is being entered;
outputting, on the display, the partial second modality search results incrementally as the second input modality is still being entered;
retrieving, from the database, final second modality search results based on the first modality search results and the second input modality upon the second input modality being completely entered; and
outputting, on the display, the final second modality search results.

* * * * *